(12) United States Patent
Mor et al.

(10) Patent No.: US 12,061,605 B2
(45) Date of Patent: Aug. 13, 2024

(54) SYSTEM AND METHOD FOR ASSOCIATING RECORDS FROM DISSIMILAR DATABASES

(71) Applicant: Genpact USA, Inc., New York, NY (US)

(72) Inventors: Yudhvir Mor, Rohtak (IN); Rakesh Verma, Pune (IN); Sunil Yadav, Bhopal (IN)

(73) Assignee: Genpact USA, Inc., New York, NY (US)

( * ) Notice: Subject to any disclaimer, the term of this patent is extended or adjusted under 35 U.S.C. 154(b) by 0 days.

(21) Appl. No.: 16/983,897

(22) Filed: Aug. 3, 2020

(65) Prior Publication Data

US 2021/0157809 A1    May 27, 2021

Related U.S. Application Data

(60) Provisional application No. 62/935,467, filed on Nov. 14, 2019.

(51) Int. Cl.

| | |
|---|---|
| *G06F 16/00* | (2019.01) |
| *G06F 16/2455* | (2019.01) |
| *G06F 16/27* | (2019.01) |
| *G06N 20/00* | (2019.01) |
| *G06Q 30/04* | (2012.01) |

(52) U.S. Cl.
CPC ......... *G06F 16/2455* (2019.01); *G06F 16/27* (2019.01); *G06N 20/00* (2019.01); *G06Q 30/04* (2013.01)

(58) Field of Classification Search
CPC .............................. G06F 16/2455; G06F 16/27
See application file for complete search history.

(56) References Cited

U.S. PATENT DOCUMENTS

| | | | | |
|---|---|---|---|---|
| 9,898,515 | B1* | 2/2018 | Avagyan | G06F 16/29 |
| 2013/0085910 | A1* | 4/2013 | Chew | G06Q 40/02 |
| | | | | 705/30 |
| 2015/0324930 | A1* | 11/2015 | Abernethy | G06Q 40/02 |
| | | | | 705/30 |
| 2019/0012733 | A1* | 1/2019 | Gorman | G06Q 40/12 |
| 2020/0387963 | A1* | 12/2020 | Byiringiro | G06N 3/044 |
| 2021/0241177 | A1* | 8/2021 | Wang | G06N 5/04 |

\* cited by examiner

*Primary Examiner* — Khanh B Pham (74) *Attorney, Agent, or Firm* — Goodwin Procter LLP (57) ABSTRACT

A method and system are provided for matching database records. According to one embodiment, the method includes receiving a record from a first database, and selecting a sequence of characters within the record. The method also includes identifying a key associated with a second, dissimilar database by comparing the selected sequence with a number of historical records. The comparison is performed using one or more analytical processes, where at least one analytical process is a machine-learning (ML) process. The method further includes matching, using the key, the record from the first database with another record from the second database, where the other record includes the identified key.

22 Claims, 9 Drawing Sheets

Table 1: An Example Bank Statement

| Transaction Date | Description | Reference No | Amount | Currency |
|---|---|---|---|---|
| 02/09/2017 | NMSC NONREF DC 1004230441 50 NONREF DC 1004230441 50 000000000000 EVAN TURBOTT LAW | FT17040630079051 | 120756 | USD |
| 09/02/2017 | DEPOSIT ELPHINSTONE GROUP | FT17040630086055 | 1680.67 | USD |
| 09/02/2017 | DEPOSIT USQ Finance 091508 | FT17040650079051 | 13497 | USD |
| 10/02/2017 | NMSC REF REM ADV DC NONREF 50 REF REM ADV DC NONREF 50 000000000000AVSEC | FT17040730078976 | 1780 | USD |
| 10/02/2017 | DEPOSIT CBA Inv 837085344 | FT17040630071234 | 5088.9 | USD |
| 11/02/2017 | DEPOSIT DFS Cust No. 6119546520 | FT17040630075645 | 633.36 | USD |
| 12/02/2017 | DEPOSIT ONLINE 2108246 PYMT Community | FT17040630097089 | 671.06 | USD |
| 12/02/2017 | DEPOSIT DFS Cust No. 6119546520 | FT17040630089054 | 45521.3 | USD |
| 12/02/2017 | NMSC REF REM ADV DC NONREF 50 REF REM ADV DC NONREF 50 000000000237AVSEC | FT17040630079258 | 633.36 | USD |
| 12/02/2017 | Deposit SIP FS Incoming | FT17040630079456 | 1256.89 | USD |

FIG. 1

Table 2: Customer Master Database

| Customer Name 204 | Customer Number |
|---|---|
| ENDV EDUCATION PTY LTD, ENDV EDU | 1004158591 |
| EMER SERVICES LEVY INSU | 1005210730 |
| EVA TURBO LAW OFFICE, EVA LEGAL | 1004230441 |
| ELPHIN GRO PTY LTD, SENTEO LLC | 1004985806 |
| Direct Deposits Holding Acct, MMM FUNDS | 1004191923 |
| AVIA SECURE SERVICE | 1004035735 |

Table 4: Invoice-Master Database

| Invoice Number | Invoice Details | Customer Name | Customer Number |
|---|---|---|---|
| 837085344 | {"description": "", "amount":9999, "due date":"YYYY-MM-DD"} | ENDV EDUCATION PTY LTD, ENDV EDU | 1004158591 |
| 611954652 | {"description": "", "amount":9999, "due date":"YYYY-MM-DD"} | EMER SERVICES LEVY INSU | 1005210730 |
| 837085366 | {"description": "", "amount":9999, "due date":"YYYY-MM-DD"} | EVA TURBO LAW OFFICE | 1004230441 |
| 837055378 | {"description": "", "amount":9999, "due date":"YYYY-MM-DD"} | ELPHIN GRO PTY LTD | 1004985806 |
| 837045354 | {"description": "", "amount":9999, "due date":"YYYY-MM-DD"} | Direct Deposits Holding Acct | 1004191923 |
| 837095397 | {"description": "", "amount":9999, "due date":"YYYY-MM-DD"} | ELPHIN GRO PTY LTD | 1004985806 |

FIG. 4

Table 5: Pre-Processed Historical Records

| Payment Description | Customer Name | Customer Number |
|---|---|---|
| DEPOSIT CBA Inv 837085344 | ENDV EDUCATION PTY LTD | 1004158591 |
| DEPOSIT DFS 6119546520 | EMER SERVICES LEVY INSU | 1005210730 |
| NMSC NONREF DC 1004230441 50 NONREF DC 1004230441 50 000000000000EVA TURBO LAW | EVA TURBO LAW OFFICE | 1004230441 |
| DEPOSIT ELPHIN GRO | ELPHIN GRO PTY LTD | 1004985806 |
| DEPOSIT USQ Finance 091508 | Direct Deposits Holding Acct | 1004191923 |
| NMSC REF REM ADV DC NONREF 50 REF REM ADV DC NONREF 50 000000000000AVSEC | AVIA SECURE SERVICE | 1004035735 |

| Input | Data Pre-Processing | Identity Rule | Named Entity Recognition | Pattern Similarity | Aggregation | Output |
|---|---|---|---|---|---|---|
| Deposit DFS Cust No. 6119546520 | Deposit DFS Cust No 6119546520 | Deposit DFS Cust No 6119546520 | Deposit DFS Cust No 6119546520 | No Processing required since Customer is Identified using Identity Rule. | Identity Rule: True<br><br>Named Entity Recognition: False<br><br>Pattern Similarity: False | [ { "customer_name":"ENDV EDUCATION PTY LTD", "customer_account_no": "1004158591", "score": 0.75 }, { "customer_name":"EMER SERVICES LEVY INSU", "customer_account_no": "1005210730", "score": 0.50 } ] |

FIG. 7A

| Input | Data Pre-Processing | Identity Rule | Named Entity Recognition | Pattern Similarity | Aggregation | Output |
|---|---|---|---|---|---|---|
| NMSC NONREF DC 1004230441 50 NONREF DC 1004230441 50 000000000000 EVA TURBO LAW | NMSC NONREF DC 1004230441 50 NONREF DC 1004230441 50 000000000000 EVA TURBO LAW | NMSC NONREF DC 1004230441 50 NONREF DC 1004230441 50 000000000000 EVA TURBO LAW | NMSC NONREF DC 1004230441 50 NONREF DC 1004230441 50 000000000000 EVA TURBO LAW | No Processing required since Customer is Identified using Named Entity Recognition | Identity Rule: False<br><br>Named Entity Recognition: True<br><br>Pattern Similarity: False | [ { "customer_name":"ENDV TRUBO LAW", "customer_account_no": "1004230441", "score": 0.775 }, { "customer_name":"EMER SERVICES LEVY INSU", "customer_account_no": "1005210730", "score": 0.225 } ] |

*FIG. 7B*

| Input | Data Pre-Processing | Identity Rule | Named Entity Recognition | Pattern Similarity | Aggregation | Output |
|---|---|---|---|---|---|---|
| DEPOSIT USQ Finance 091508 | DEPOSIT USQ Finance 091508 | DEPOSIT USQ Finance 091508 | DEPOSIT USQ Finance 091508 | Step 1) DEPOSIT USQ Finance 0915XXX<br><br>Step 2) {4.52269225e-02, -2.08165366e-02, -1.14032835e-01, 9.65272371e-02,<br>...<br>6.25584929e-03, -2.78176945e-02, -0.41973848e-01, 1.11024225e-01}<br><br>Step 3) Cosine Similarity = 0.59 Ratcliff-Obershelp Similarity = 0.55 RMSE = 0.019 | Pattern Similarity : 0.57 (0.59 + 0.55) / 2 = 0.57<br><br>RMSE: if RMSE <= 0.02 then add 0.1 else 0.0<br><br>AGG. Score: 0.57 + 0.1 = 0.67 (Pattern Similarity + RMSE) | [ {"customer_name":"Direct Deposits Holding Acct", "customer_account_no": "100419192​3", "score": 0.67 }, { "customer_name":"EMER SERVICES LEVY INSU", "customer_account_no": "1005210730", "score": 0.20 } ] |

SYSTEM AND METHOD FOR ASSOCIATING RECORDS FROM DISSIMILAR DATABASES

CROSS-REFERENCE TO RELATED APPLICATIONS

This application claims priority to and benefit of U.S. Provisional Patent Application No. 62/935,467, entitled "System and Method for Determining Customer Payments from Bank Statements," filed on Nov. 14, 2019, the entire contents of which are incorporated herein by reference.

FIELD

This disclosure generally relates to artificial intelligence (AI)/machine learning (ML) techniques and, in particular, to training and use of AI/ML systems to match records from dissimilar databases.

BACKGROUND

In many applications, ranging widely from manufacturing, scientific discovery, banking, supply-chains, medical diagnosis and treatment, etc., large amounts of data are generated and consumed. Such data is often stored and accessed from database systems such as relational databases, structured-query-language (SQL) databases, and non-SQL (also called NOSQL) databases. While not essential to or used in all kinds of databases, key-value pairs are often employed to access and store database records efficiently. In a key-value pair, a unique key is associated with a record and, in each record, one or more values are associated with a particular key. A record can include more than one keys, where one key is typically the designated primary key and other keys, generally, are the secondary keys.

For example, in a database for medical data, a PatientID may uniquely identify all the patients of a particular healthcare provider and values, such as patent name, phone number, address, etc., can be associated with each PatientID. Likewise, a DoctorID may uniquely identify all the doctors affiliated with the particular healthcare provider and values, such as doctor name, phone number, address, etc., can be associated with each DoctorID. Furthermore, in a patient record, a DoctorID can be a value associated with the key PatientID for that record. This association can identify a primary care doctor of the patient identified by the key PatientID. Similarly, another value in the patient records can be InsurerID, identifying the insurance carrier of the patient.

The association described above can be bidirectional or multi-way. For example, in a doctor's record, several different PatientIDs can be included as values associated with the key DoctorID, identifying the patients seen by a particular doctor. Similarly, in a record for a particular insurance provider that is assigned a unique InsurerID, several DoctorIDs may be included as values, identifying the doctors in that insurance provider's network of affiliated or approved doctors.

Association or linking of different records using keys is common practice in many database systems, especially in relational databases, but also in SQL and NOSQL databases. Such an association generally assumes, however, that all the different records belong to a single database system, or to different database systems that have common rules for generating different types of primary and secondary keys. If different database systems generate their respective keys in different ways and use different types of keys to store otherwise similar information, association of the records from such dissimilar database system becomes challenging, if not impossible, and can be erroneous.

SUMMARY

Methods and systems for training AI/ML systems and using such systems for accurately matching records from one database with records from another, dissimilar, independent database, are disclosed. According to one embodiment, a method includes receiving a record from a first database, and selecting a sequence of characters within the record. The method also includes identifying a key associated with a second, dissimilar database by comparing the selected sequence with a number of historical records. The comparison is performed using one or more analytical processes, where at least one analytical process is a machine-learning (ML) process. The method further includes matching, using the key, the record from the first database with another record from the second database, where the other record includes the identified key.

BRIEF DESCRIPTION OF THE DRAWINGS

The present embodiments will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the present embodiments. In the drawings:

FIGS. 7A-7C show predictions performed by an AI/ML system according to one embodiment.

DETAILED DESCRIPTION

The following disclosure provides different embodiments, or examples, for implementing different features of the subject matter. Specific examples of components and arrangements are described below to simplify the present disclosure. These are merely examples and are not intended to be limiting.

For the sake of simplicity of explanation and brevity, the discussion below uses a concrete example of the accounts receivable process in which records from two dissimilar databases are matched. One database is created and maintained by a vendor and includes information about the vendor's customers, including invoices for goods and/or services provided to those customers. The other database is created and maintained by a bank which may receive payments from several customers of the vendor. The bank typically reports such payments in a bank statement.

The bank's database, however, is independent of the vendor's database and, as such, a particular customer may be identified in two very different ways in the vendor's database and in the bank statement, respectively. This makes the task of associating a record in a bank statement, e.g., the payment of an invoice by a particular customer, with another record in the vendor's database, e.g., an invoice sent to that particular customer, challenging if not impossible. The complexity of this problem increases further when the vendor's database does not identify all the customers in the same way and, instead, uses different types of keys or other identifiers to identify different vendors. Various technique described herein employ machine learning to associate records from such two dissimilar databases.

In general, different embodiments of artificial intelligence/machine learning (AI/ML) systems described herein can be trained to match records from different types of dissimilar databases. For example, a failure-prediction system may monitor, via sensors, the operating conditions of machinery or equipment, and may predict fatigue or likelihood of failure of machine parts and components. The failure likelihood information for different parts may be stored in a failure-prediction database. A maintenance system may store in a dissimilar, parts-maintenance database, maintenance and service records for the different parts, including repair and replacement of various machine parts and components. Embodiments of the AI/ML system described herein can associate records from the two database systems, even if the two systems identify the machine parts/components in different ways. With such association, the failure-prediction system can update the failure predictions, based on the maintenance records.

In a typical accounts receivable (AR) process, a vendor applies incoming payments from a bank to the correct customer accounts and receivable invoices. This is generally known as cash application. In order to do this properly, the first step is for the vendor to determine which customer account to which the received payment(s) should be applied. The vendor's accounts receivable department matches the incoming payment to the customer's invoice(s). The payments received in the vendor's bank account are reviewed and matched from a bank statement that includes payments from multiple customers. It is often very difficult and error prone to identify the correct customer from bank statements based on the payment transaction detail/narrative and/or other attributes available in the bank statements. This is often a manual process performed by members of the accounts receivable team.

Figure 1:
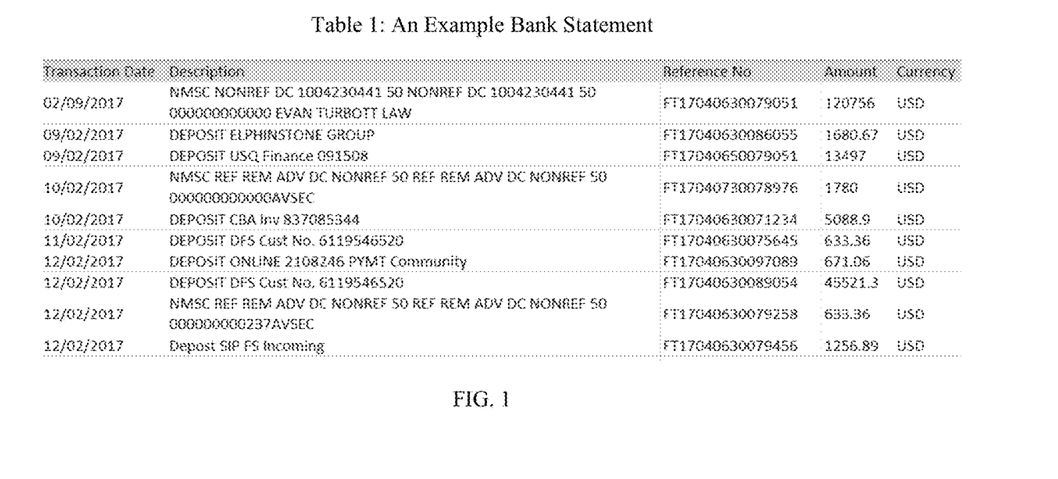
FIG. 1 shows an example bank statement, the records from which may be processed according to various embodiments.

Generally, there are many variations in bank statements regarding how the payment transaction details are described. Usually, the payment transaction details/description are the combination of text and numeric values that may include an invoice number, customer name (e.g., the name of the organization/client/customer of the vendor), other business reference number(s), and/or random text strings. A text string may be a number, letter, or alphanumeric string placed between two spaces or other delimiters (e.g., commas, colons, etc.) on a form. The banking systems or the payees themselves may provide the text in the description field or a part thereof. Table 1 shown in FIG. 1 is an example bank statement received from a bank by a vendor that shows credited entries for payments received by the vendor. Table 1 illustrates that a customer associated with a particular transaction/payment cannot be readily identified from the bank statement.

Some embodiments of the AI/ML system (referred to simply as "some AIS/MLS embodiments," hereinafter) described herein can identify the correct customer by interpreting the payment description information provided in a bank statement. Examples of transaction/payment descriptions that can be processed by some AIS/MLS embodiments include: "DEPOSIT CBA Inv 837085344" and "DEPOSIT DFS Cust No. 6119546520." In these examples, the AIS/MLS embodiments perform natural-language processing (NLP) to determine that the string "837085344" is an invoice number and that the string "6119546520" is a customer number (e.g., a unique identifier) that may be created by the vendor to identify its customer/clients in the vendor's database, which is not coordinated with the bank's database.

Some AIS/MLS embodiments can analyze a payment transaction description included in a bank statement to identify the customer name. To illustrate, consider the descriptions: "NMSC NONREF DC 100423044150 NON-REF DC 100423044150 000000000000 EVAN TURBOTT LAW" and "DEPOSIT ELPHINSTONE GROUP" In these examples, some AIS/MLS embodiments determine that the string "EVAN TURBOTT LAW" and "ELPHINSTONE GROUP" are customer names.

Additionally or in the alternative, some AIS/MLS embodiments can analyze the payment transaction descriptions included in the records in a bank statement to identify and interpret token patterns. Examples of such descriptions include: "DEPOSIT USQ Finance 091508" and "NMSC REF REM ADV DC NONREF 50 REF REM ADV DC NONREF 50 000000000000AVSEC" In these examples, each individual word may be treated as a token, and a pattern is identified to decipher a customer name, customer number, etc.

The analysis performed by various AIS/MLS embodiments is not limited to analyzing payment descriptions only. In general, any text can be processed to extract therefrom information or keys such as customer names and/or numbers, account names, invoice numbers, part numbers, service codes, codes indicating diagnostic conditions, etc. To this end, various AIS/MLS embodiments employ natural language processing and/or machine learning that can accurately predict keys based on patterns in historical data. The key extraction process can be trained and configured for many different types of databases and, in general, the solution is scalable and highly available, and requires minimal human interaction, if any.

Referring again to the foregoing example of accounts receivable process, some AIS/MLS embodiments read the freeform text in one database record (e.g., payment transaction detail/description from a bank statement) and determines the customer name and/or customer account number using machine learning models, so that the received payments can be applied to matching invoices in the invoice/vendor database. Some AIS/MLS embodiments post this information to an accounts receivable system that, in response, automatically applies the payment to the correct customer account and invoice(s). Thus, a record from one database is associated with another record from a different, independently designed, unrelated database. Historical data may be used to train the machine learning model (ML model) to map payment transaction description to a customer account name or number.

Figure 2:
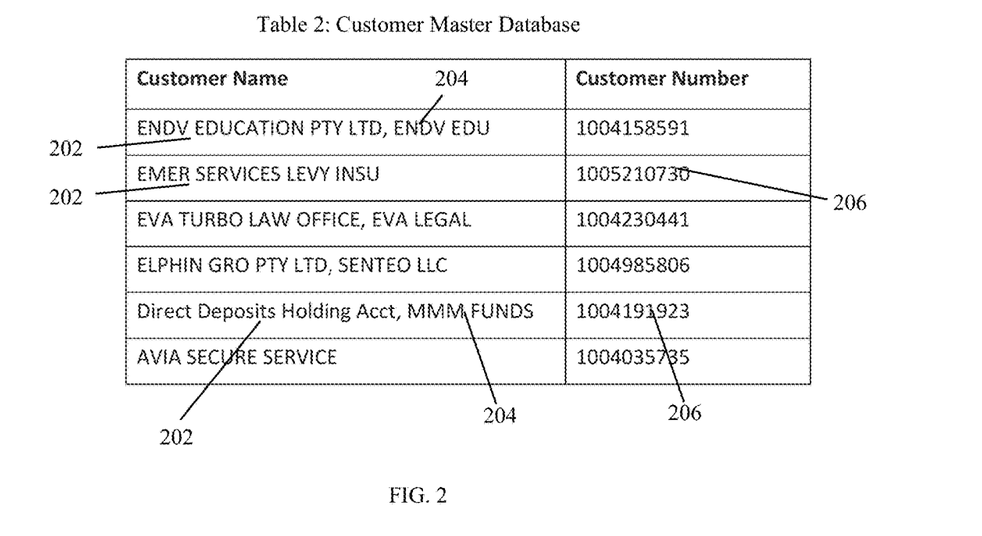
FIG. 2 shows an example customer master database, which is part of an invoice database that is unrelated to and independent of a bank database that provided the bank statement shown in FIG. 1.

Some AIS/MLS embodiments generate a mapping between different payment transaction records and account numbers or customer numbers shown in Table 2 of FIG. 2. Table 2 is an example of a master customer database, where each row of Table 2 includes a customer name 202; optionally, variations of the customer name 204; and the customer's unique customer number 206. The customer name and its variations are extracted by applying the ML model to the payment transaction records, or to the description fields of such records. As noted above, these records, which are stored in a bank database, are typically provided in a bank statement. The unique customer numbers, however, are provided in the vendor database that is designed and developed independently of the bank database. The vendor database lists one or more customer names for each customer account number. The customer name extracted by some AIS/MLS embodiments from a bank record is matched with the customer names in the vendor database and, when a match is found, the bank record may be associated with the customer account number corresponding to the matching name.

Figure 3:
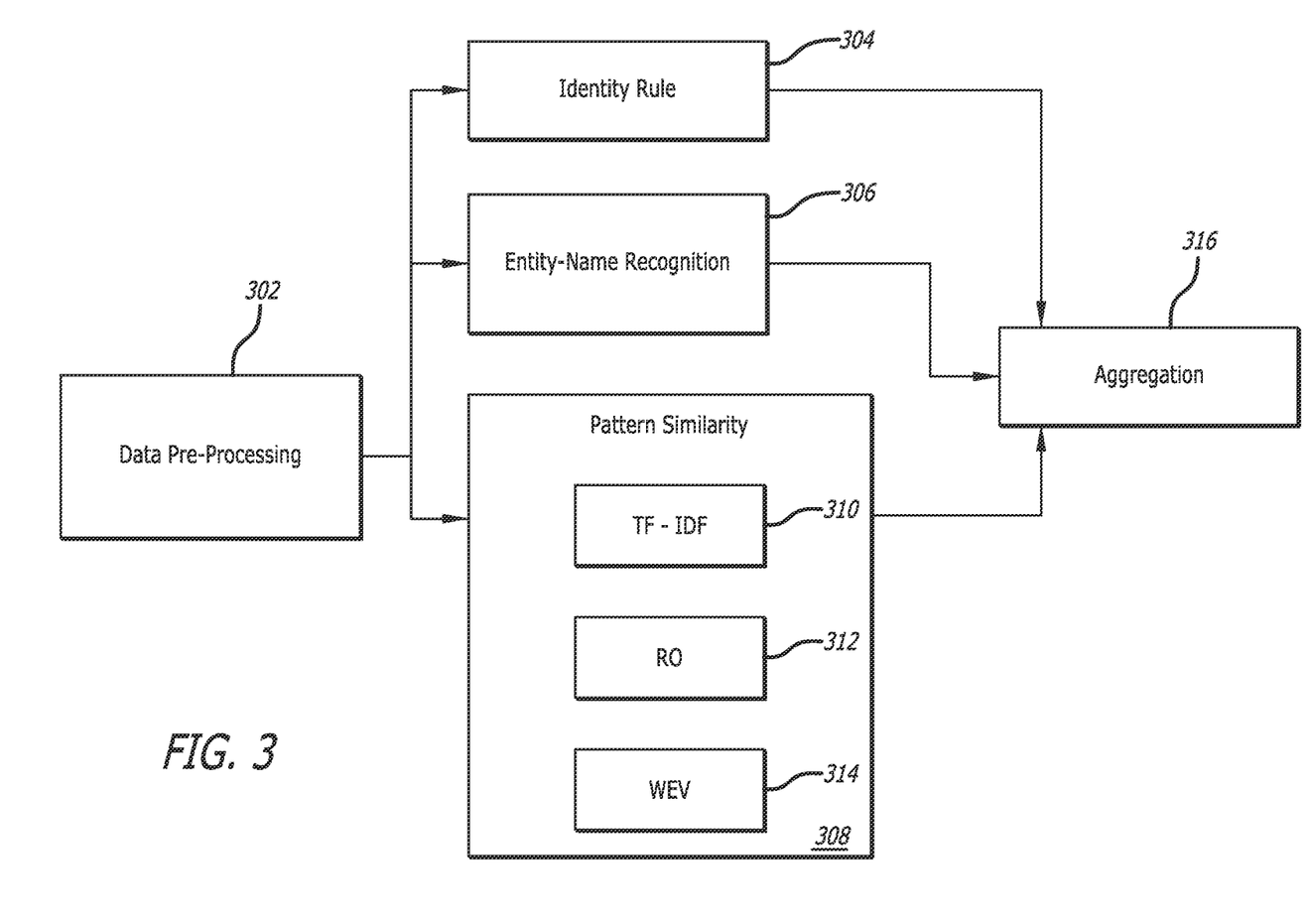
FIG. 3 is a block diagram of an artificial intelligence (AI)/machine learning (ML) based system for matching records from dissimilar databases, according to one embodiment.

FIG. 3 is a block diagram of an example AI/ML system. With reference to FIG. 3, some AIS/MLS embodiments include a data pre-processing module 302 that applies string operations to the description text from a bank statement to standardize inputs to be processed by the ML model. For example, the dates in the description that may have different formats, such as YYYY-MM-DD, or DD-MM-YYYY, or DD-MM-YY, are converted to a standardized format such as MM-DD-YY or to the string "DD." Special characters (e.g., *, -, /, \, :, %, #, @, !, $, ", &, etc.) may be removed from the description text.

Some AIS/MLS embodiments includes an identity rule module 304 for applying one or more database rules. The identity rule module 304 may use regular expression matching to extract possible keys corresponding to records in a particular database, e.g., invoice numbers and/or customer numbers that can identify customers. A dynamic regular expression may be generated based on database rules. For example, a database rule may state that a sequence of numbers starting with 8 or 6 and has a length of 9 digits is an invoice number. In other words, the vendor database generates invoice numbers for customers that always start with 8 or 6 and are 9 digits long. Thus, the regular expression "[89)\d{8}" can generate an invoice number.

Such a sequence of numbers may be contained in a longer string of alpha-numeric text. Some AIS/MLS embodiments can identify subsequences that can be generated by regular expressions (e.g., invoice numbers and, in general, keys) within the description text of a record of one database to find invoice numbers (or, in general, keys of another database). A regular expression is said to be dynamic when an embodiment of the AI/ML system creates that regular expressions using the rules of one database when the system is processing records of another database (e.g., records in a bank statement).

Figure 4:
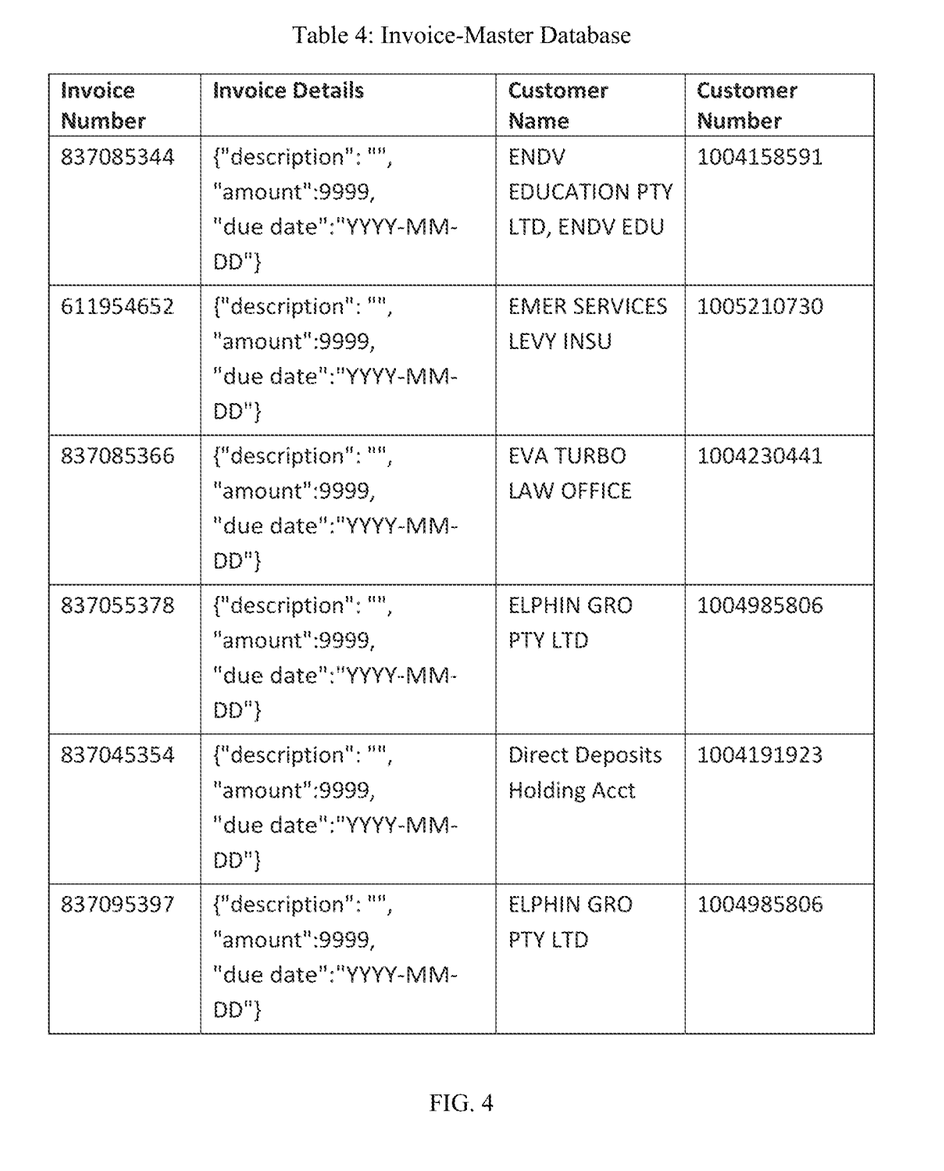
FIG. 4 is an example invoice master database.

In some AIS/MLS embodiments, the invoice numbers extracted from the records of the bank database, where such records are accessed from a bank statement, are matched against a master invoice database (which may be presented in the form of a spreadsheet). An example of a master invoice database is shown as Table 4, in FIG. 4. If a match is found, the result may be passed to an aggregation module, the function of which is described below.

Referring again to FIG. 3, some AIS/MLS embodiments include an entity-name recognition module 306 (also called named entity recognition module) that can find the name of an organization (e.g., a customer entity) in a description, by using a machine learning model trained on an organization entity name ontology and/or historical database records. In some embodiments, the machine learning process employed by the entity-name recognition module 306 is conditional random field, which takes into account the context of one or more words in determining whether those words indicate an entity name. In some cases, the context can be the description field or a portion thereof. An extracted name may be matched with customer names in a master customer database, such as, e.g., Table 2 (FIG. 2). If match is found, the result may be passed to the aggregation module discussed below. In Table 2, the customer name is not a single name or a string. Instead, as described above, one or more values (e.g., comma-separated strings) may represents different names of the same customer or variations of the customer name.

Some AIS/MLS modules include a pattern similarity module 308. This module uses natural language processing and/or machine learning to find patterns in textual information to identify a customer based on historical patterns. In general, the pattern similarity module can compare one sequence of characters (numbers, letters, symbols, etc.) with another sequence. In some cases, a string or list of tokens generated from a character sequence is compared with another token string/list generated from a different character sequence. A number sequence, for example, can be a particular sequence of numbers that repeats at least partially or is a unique number (e.g., a number having no more than a specified number of digits), that occurs frequently or regularly in the payment descriptions of the bank records for a particular customer. One example of a number sequence is a customer number that is fully or partially repeated; another example is a serial number that is partially repeated across the respective description fields in several different bank statements over a period of time.

Specifically, a number (e.g., 140785453) may be found in the description field of one bank statement and a portion thereof (e.g., 1407) may be found to be repeated in several bank statements received over a six-month period. As such, some AIS/MLS embodiments convert the number 140785453 (a number sequence, generally) into a token "1407<UNKNOWN>." In some embodiments, the numbers that are determined to be unique are replaced with the token "NN." While training the ML model, if an embodiment of the AI/ML system finds that several customer numbers are reflected in the description or that the same payment description is associated with the records for more than one customer, those customers may be removed from the description field and/or the master customer table, to avoid ambiguity.

The pattern similarity module may be trained to extract fully or partially repeating character sequences or unique character sequences using training datasets generated from historical data, such as historical records having descriptions from which the repeating or unique sequence(s) are to be extracted. With reference to the foregoing example, historical records can be customer records in historical bank statements.

Figure 5:
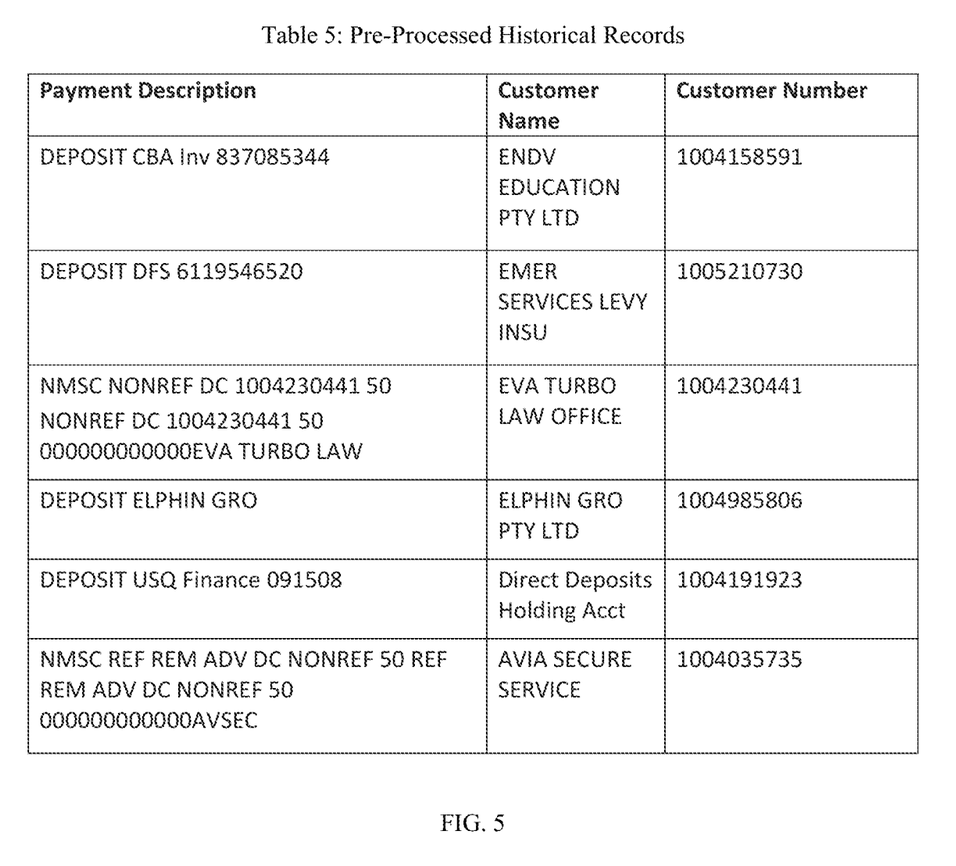
FIG. 5 shows example records after pre-processing thereof, according to some embodiments.

During training of the ML model, a historical dataset may be processed, as described above, e.g., to remove certain special characters, to standardize date formats, etc. Table 5 shown in FIG. 5 provides an example of pre-processed historical records that may be used for training various ML models. Referring again to FIG. 3, after the pre-processing, in some cases the description strings in the dataset are converted into Term Frequency-Inverse Document Frequency (TF-IDF) vectors, using a TF-IDF module 310 that is part of the pattern similarity module 308. A pair of description strings and/or individual words or tokens in these strings can be compared by the TF-IDF module 310 using the cosine similarity measure between the TF-IDF vectors corresponding to the string (or words or tokens). Cosine similarity is a measure of similarity between two non-zero vectors of an inner product space that measures the cosine of the angle between the two vectors. The cosine of 0°, i.e., perfectly aligned or identical vectors, is 1, and it is less than 1 for any angle in the interval (0, π] radians. It is thus a measure of difference in orientation and not the difference in magnitude.

The TF-IDF scoring process can be used for information retrieval (IR) or summarization. Textual data may be converted into a vector representation for faster comparison because numbers can generally be analyzed more easily by a processor than character strings. For Example, the text string "DEPOSIT USQ Finance 091508" is converted to the TF-IDF vector:

[0.099021, 0.000000, 0.000000, 0.099021, 0.099021, 0.000000,
. . .
0.099024, 0.000000, 0.089021, 0.000450, 0.099015, 0.000000]

In a TF-IDF vector, each element of the vector is a TF-IDF score for a corresponding word/token (typically referred to as a term) in a sentence or a sequence of words/tokens (typically referred to as a document). The term frequency (TF) portion of the TF-IDF score indicates how important a particular term is to a document. One measure of the importance is a count of occurrences of the term in the document. Another measure is the frequency of the term, which may be computed as the count of the term divided by the total number of terms in the document. Other measures of TF may also be used. The inverse document frequency (IDF) portion of the TF-IDF score for a term indicates how much information the term provides. In other words, the IDF measures whether the term is common across several documents or is rare or unique to some documents.

The TF-IDF score of a term with respect to a particular document is the product of the TF score of that term for that document and the IDF score for that term across all available documents. In general, if a term occurs frequently in a particular document (e.g., a description string or a database record, generally) but does not occur across several documents, the TF-IDF score of that term for that particular document is high. Otherwise, the TF-IDF score is low. Thus, a high TF-IDF score generally indicates that a particular term is rare across several documents, but is important to a particular document. After generating two TF-IDF vectors for two records or parts of records, such as description strings, the records or parts thereof can be compared by computing the cosine similarity, described above, between the two TF-IDF vectors.

Some AIS/MLS embodiments perform another comparison of description text from one record with description texts from historical records in an RO module 312 that may be included in the pattern similarity module 308. The RO module 312 uses the Ratcliff-Obershelp process that finds the longest common substring from two alphanumeric strings. In these embodiments, the common substring is removed from each of the two strings and each string is split into two parts (unless the start (or end) of common substring coincided with the start (or end) of a string). In general, each of the two strings is divided into two parts, one to the left of the common substring, to yield respective left strings, and the other to the right of the common substring, to yield respective right strings.

The respective left strings are compared again to find the longest common substring therebetween, and the respective right strings are compared again, to find the longest common substring therebetween. Each left string is then divided further into new left and right strings, and each right string is also divided further into new left and right strings. This process is repeated until the size of a left or a right string is less than a default value (e.g., 2, 3, 5 characters, etc.). A second similarity score may then be computed as:

$$D_{ro} = \frac{2K_m}{|S_1| + |S_2|}$$

where $D_{ro}$ is the Ratcliff-Obershelp similarity score; $K_m$ is the number of characters found in common across all iterations of finding common substrings, and $|S_1|$ and $|S_2|$ are, respectively, the number of characters in each of the strings $S_1$ and $S_2$ that were compared. The number of matching or common characters is defined as the length of the longest common substring (LCS) at each iteration where, for the first iteration, the LCS is found between the two original strings $S_1$ and $S_2$ and, for the subsequent iterations, the LCS are found between respective left strings and respective right strings formed in the previous iteration.

As an illustration of the Ratcliff-Obershelp similarity score, consider the text strings:

text1="DEPOSIT IND Finance 0915<UNKNOWN>"
text2="DEPOSIT Finance IND 0915<UNKNOWN>"
text3="DEPOSIT USQ Finance 0915<UNKNOWN>"

The Ratcliff-Obershelp similarity score for the pair of strings text1 and text2 is 0.87, and the Ratcliff-Obershelp similarity score for the pair of strings text1 and text3 is 0.90. In general, Ratcliff-Obershelp similarity score can take a value between zero and one, i.e., $0 \leq D_{ro} \leq 1$. The value of "1" indicates a perfect match of the two strings, and the value "0" indicates that there is no match, i.e., not even one common character. Some AIS/MLS embodiments employ both comparisons techniques described above because together they may perform better than using the cosine similarity analysis alone.

In some AIS/MLS embodiments, a WEV module 314 is provided as part of the pattern similarity module 308. In the WEV module 314, a set of description fields from many historical bank statements is converted to word embedding vectors using, e.g., the Global Vectors for Word Representation (GloVe). Word embeddings generally provide a word representation that bridges the human understanding of a language and that of a machine. Word embeddings are commonly understood as distributed representations of text in an n-dimensional space. The dimensionality of the space, i.e., the value of n, can be the total number of words in the historical records. Word embedding vectors can quantify and categorize semantic similarities between linguistic items based on their distributional properties in large samples of language data.

Some AIS/MLS embodiments use word embedding to determine whether different synonyms are used to represent the same information in different ways. For example, the example description text "DEPOSIT USQ Finance 091508" may be converted into a 300-dimensional vector:

[4.52269225e-02, −2.08165366e-02, −1.14032835e-01, 9.65272371e-02, . . . , 6.25584929e-03, −2.78176945e-02, −0.41973848e-01, 1.11024225e-01]

The vector corresponding to description text "PAYMENT USQ Finance 091508" was observed to be similar to the vector shown above because the word embedding process understood that the words DEPOSIT and PAYMENT are synonyms.

For each word embedding vector, a root mean squared error (RMSE) score may be computed. The RMSE is the standard deviation of the residuals, where the residuals are typically a measure of how far the data points are from their regression line. The RMSE score is thus a measure of how spread out the residuals are. In other words, an RMSE score can inform how concentrated the data is around the line of best fit, e.g., the regression line. The RMSE scores of two word embedding vectors can be compared to find the similarity between the two database records or portions thereof (such as the description fields) corresponding to the two word embedding vectors.

The RMSE score provides an alternate or additional verification that allows some AIS/MLS embodiments to add a weight/bias to a confidence score obtained using the cosine similarity and/or Ratcliff-Obershelp measures. The confidence score, as described below, is a measure of how accurate a prediction of an ML model may be. If the RMSE score is less than a configurable threshold value (e.g., 0.02), then a configurable bias (e.g., 0.1) may be added to the confidence score.

Table 5 shown in FIG. 5 provides examples of records obtained from historical bank statement, where such records may be used by the TF-IDF module 310 (FIG. 3), RO module 312, and/or WEV module 314. Various AIS/MLS embodiments include an aggregation module 316 that, for a processed database record (e.g., an entry in a bank statement) aggregates the results from different analytical processes performed by the identity rule module 304, the named entity recognition module 306, and the pattern similarity module 308. The aggregation module 316 then returns the best match for the processed records according to a specified priority rules. The following is one example of priority rules implemented by one embodiment of the AI/ML system.

Invoice identity rule: If an invoice number (based on specified invoice number rules) is extracted and matched with an invoice number in the invoice master database, then this particular embodiment identifies the customer using this rule, i.e., the matched invoice number. Name identity rule: If an organization name is extracted and matched with a name in the customer master database, then this embodiment identifies the customer using the name identity rule, i.e., according to the matched customer name. The invoice identity rule and the name identity rule may be collectively referred to as the identity rule. In some cases, both the invoice identity rule and the name identity rule are applied. In other cases, the name identity rule may be applied only if the invoice identity rule fails, or vice versa.

Pattern similarity rule: If both rules described above failed to find a match, then this particular embodiment generates a pattern similarity score to identify the customer. A confidence score may also be provided by the machine learning model(s) to help gauge how accurate a customer prediction may be. If a match for a key (e.g., invoice number, customer number, customer name, etc.) is found, bank statement records including the respective description fields (records from one database, in general) are associated with the respective matching records the invoice database (with records from another database, in general), and may be stored for further processing.

Figure 6:
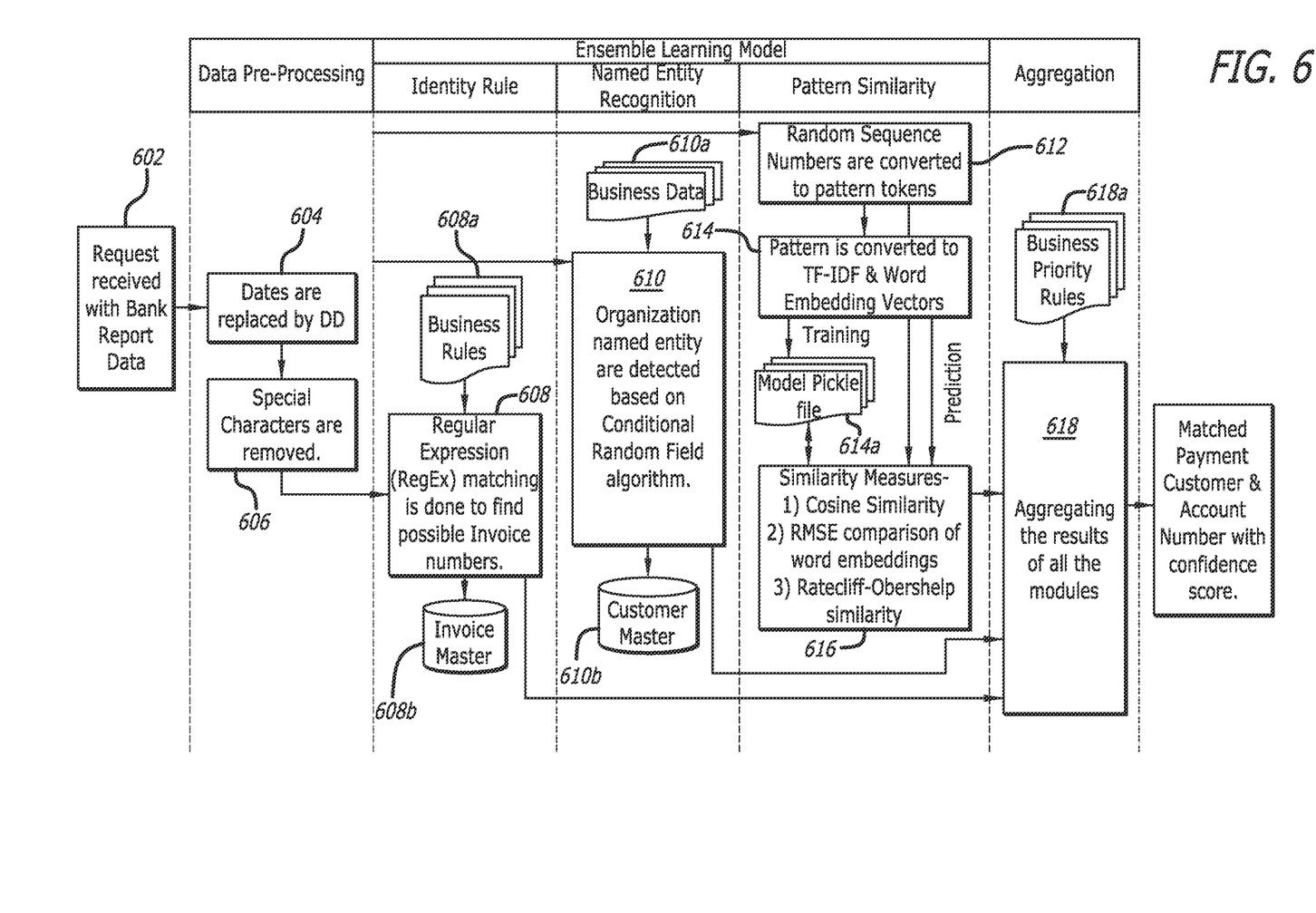
FIG. 6 is a flowchart of a process of training an AI/ML system according to one embodiment, and performing predictions using one embodiment of the trained AI/ML system.

FIG. 6 illustrates the overall training and prediction (also called inferencing) process 600, according to various embodiments. In the prediction phase, newly received records form one database (e.g., records in a bank statement) are matched using one or more ML models with records in another database (e.g., an invoice database). In the training phase, historical records are analyzed to generate one or more ML models that may then be used in the prediction phase. Many of the steps of the process 600 are performed in both training and prediction phases. When a particular step is performed in only one phase, that phase is identified specifically for that step.

In step 602 (prediction), a request to match one or more records in a bank statement is received. The bank statement or a report containing the records is also received in this step. Dates in the records may be converted into a standardized format or "DD," in step 604. Special characters in the records may be removed in step 606. After the optional preprocessing (in optional steps 604, 606), invoice identification (identification of a database key of one type, in general) is performed at step 608. To this end, database rules 608*a* (e.g., from the invoice database) are used and regular expressions may be derived and stored in the training phase. In the prediction phase, these regular expressions may be used in step 608 to find invoice numbers matching with a master invoice database 608*b*. The result(s) of the match may be passed to the aggregation step described below.

In step 610, during the training phase, a name recognition ML-model (e.g., a conditional random field model) is derived to extract entity names (database keys of another type, in general) from the historical records 610*a*. During the prediction phase, one or more pre-processed records or those that were received in step 602 are analyzed and one or more entity names (e.g., customer names; database keys of the other type, in general) are extracted in step 610 using the name recognition ML model. These names are then matched against a master customer name database 610*b*, and the result(s) of the match may be passed to the aggregation step.

During the training phase, in step 612, character sequences from the description fields of historical records are converted into lists or stings of tokens. In step 614, the token strings may be converted into TF-IDF vectors and/or word embedding vectors. During the training phase, the vectors generated from the historical records are stored as model vectors, as part of the pattern-identification ML models. The model vectors may be stored as pickle files 614*a*. During the prediction phase, in step 612, character sequences from the description fields of one or more pre-processed records and/or records received in step 602 are converted into token strings or lists. In step 614, the token strings may be converted into TF-IDF vectors and/or word embedding vectors.

These vectors are then compared, in a pairwise manner, with the model vectors, in step 616 (prediction), to determine similarity between a newly generated vector and one or more model vectors generated from the historical data. For the TF-IDF and word embedding vectors, the comparison technique can be cosine similarity. For the word embedding vectors, the comparison can be based on RMSE scores. The token strings may also be compared directly using Ratcliff-Obershelp similarity, in step 616 (prediction). The result(s) of one or more types of comparisons may be passed to the aggregation step 618 (prediction).

In the aggregation step 618 (prediction), the results from the invoice identification step 608, named entity recognition step 610, and/or pattern similarity determination step 616 are processed according to the specified priority rules 618a. These rules may include invoice identity rule, name identity rule, and pattern similarity rule, as described above. If a match is found, the aggregation step 618 (prediction) reports one or more matching database keys (e.g., customer account number corresponding to a matching customer name or to a matching invoice number) and corresponding records values (e.g., payment amount). The report may also include a confidence score. If the confidence score is at least equal to a specified, configurable threshold (e.g., 50%, 60%, 75%, etc.), the corresponding record (e.g., a bank payment record) may be associated with a matching record in another database (e.g., an invoice record).

Figure 7A:
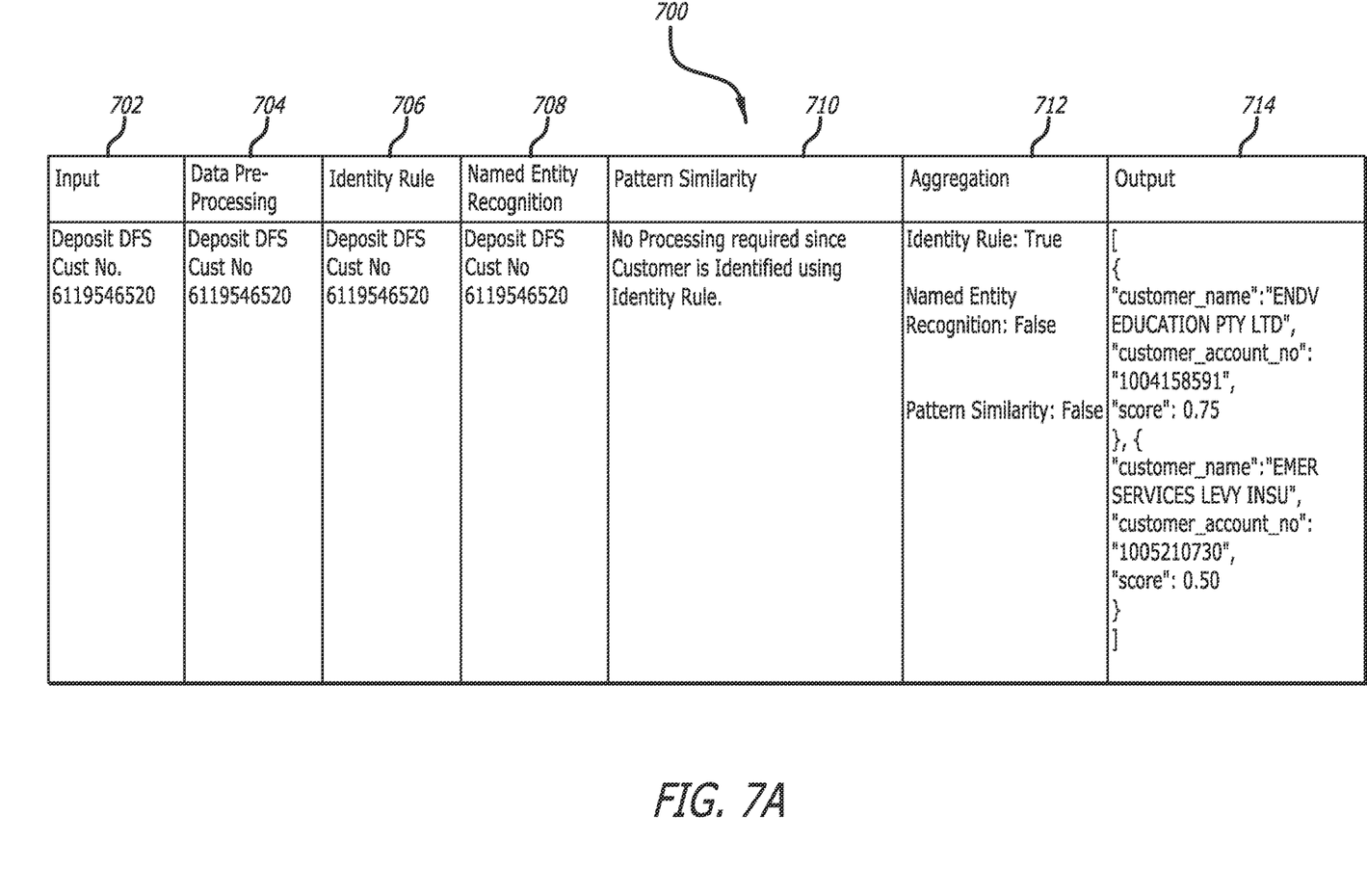
Figure 7C:
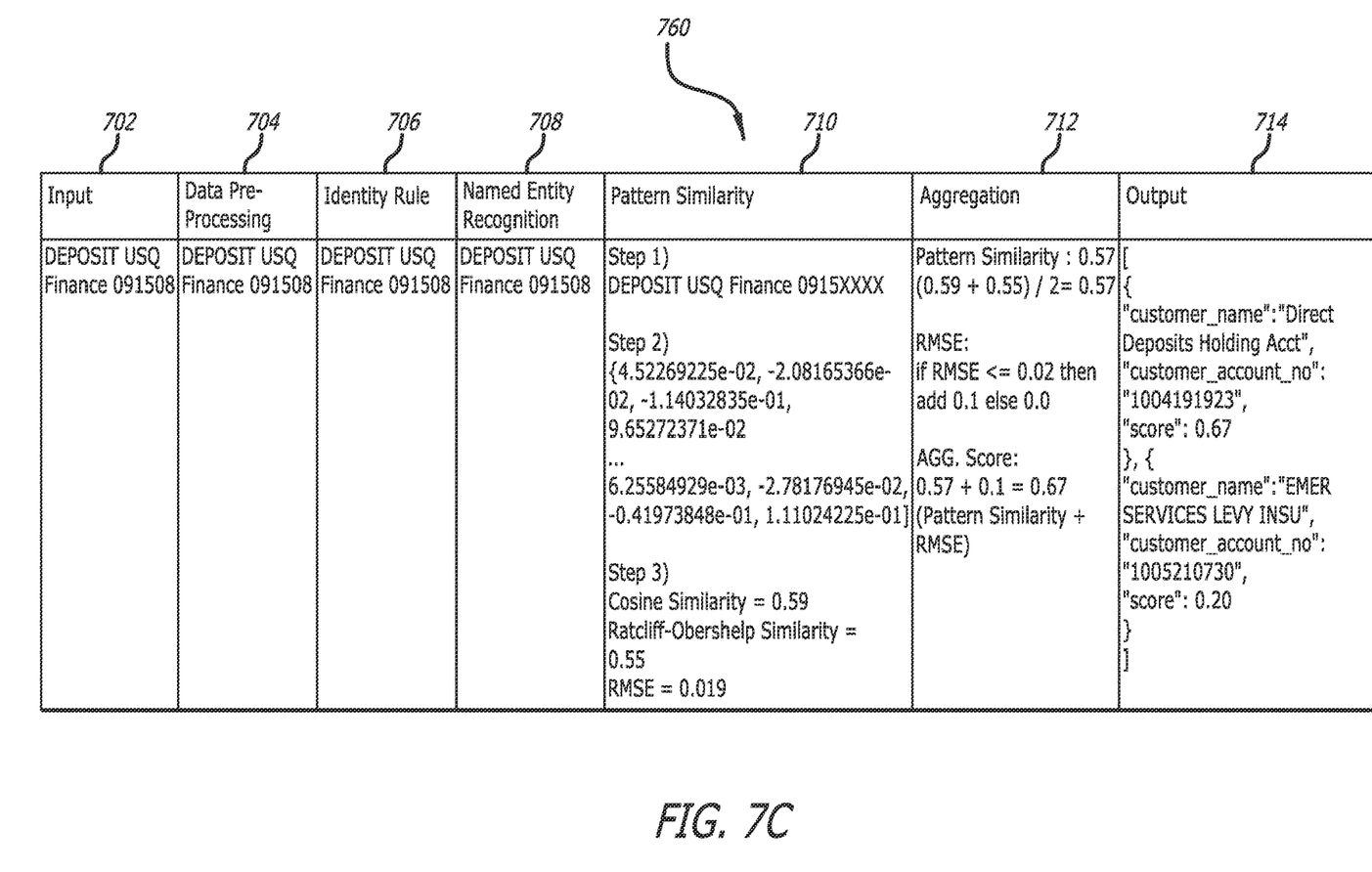

FIGS. 7A-7C illustrate customer identification, according to one embodiment. In chart 700, column 702 shows the input description string from one record in a bank statement. Column 704 shows a pre-processed input description, where the period (.) from the input string is removed because the period is a defined special character. Column 706 shows that according to the identity rule (specifically, the invoice identity rule), a matching invoice number was found in the pre-processed description. Column 708 shows that the name identity rule was also applied to the pre-processed description, but that no name was recognized. Column 710 shows that pattern similarity rule was not applied because the customer could be identified according to the identity rule (more specifically, the invoice identity rule).

Column 712 shows aggregation of the results from different rules, indicating that the invoice identity rule was successful; name identity rule failed; and pattern similarity rule failed (this designation results because the rule was not applied). Column 714 shows the output of aggregation where, based on the matches of the invoice number, the likely customers are those identified by the account numbers "1004158591" and "1005210730." Column 714 also shows that the respective confidence scores of these determinations are 0.75 and 0.5.

FIG. 7B shows chart 750 having the same columns 702-714, but with respect to a different input description. In this case, the invoice identity rule failed, by the name identification rule succeeded, recognizing a matching customer name "EVA TURBO LAW" in the processed description, as shown in column 708. Here again, because the name identification rule was successful, the pattern similarity rule was not applied. The output of aggregation in column 714 shows that the likely customers are those identified by the account numbers "1004230441" and "1005210730." In this case, column 714 also shows that the respective confidence scores of these determinations are 0.775 and 0.225.

FIG. 7C shows chart 760 also having the same columns 702-714, but with respect to yet another input description. In this case, both the invoice identity rule and the name identity rule failed, i.e., neither an invoice number nor an entity name was identified from processed description. Therefore, the pattern similarity rule was applied, as shown in column 710. Here, the processed description was converted into tokens in step 1, where the sequence "091508" was converted into a token "0915XXXX." In step 2, the tokens were converted into a TF-IDF vector. In step 3, cosine similarity and RMSE scores were computed by comparing the TF-IDF vector with the stored model vectors. In addition, Ratcliff-Obershelp similarity was also computed for the tokenized description.

Column 712 shows that a pattern similarity was determined as the average of cosine similarity and Ratcliff-Obershelp similarity. Other ways of aggregating these two similarity measures are also contemplated. The averaged similarity measure is then adjusted based on the RMSE score. Column 714 shows that based on the adjusted similarity measure, the likely customers are those identified by the account numbers "1004191923" and "1005210730." In this case, column 714 also shows that the respective confidence scores of these determinations are 0.67 and 0.20.

In some cases, the prediction accuracy of a trained AI/ML system can decrease with the passage of time. Therefore, during the prediction phase, some AIS/MLS embodiments generate a re-training alert, as illustrated in the process 800 shown in FIG. 8. In particular, in step 802 a particular AIS/MLS embodiment operates to identify database keys (e.g., customer names, identities, etc.). In step 804, a feedback module (not shown) stores in audit log(s) data containing information about all positive (correct) and negative (incorrect) customer identifications. The feedback may be provided by a user 806. For example, the accounts receivable (AR) team may review the performance of an AIS/MLS embodiment using AR workflow data 808, to determine if the AIS/ML embodiment is correctly (or incorrectly) identifying customers from the bank statement descriptions. Percentages of positive (correct) and negative (incorrect) predictions are also computed.

Figure 8:
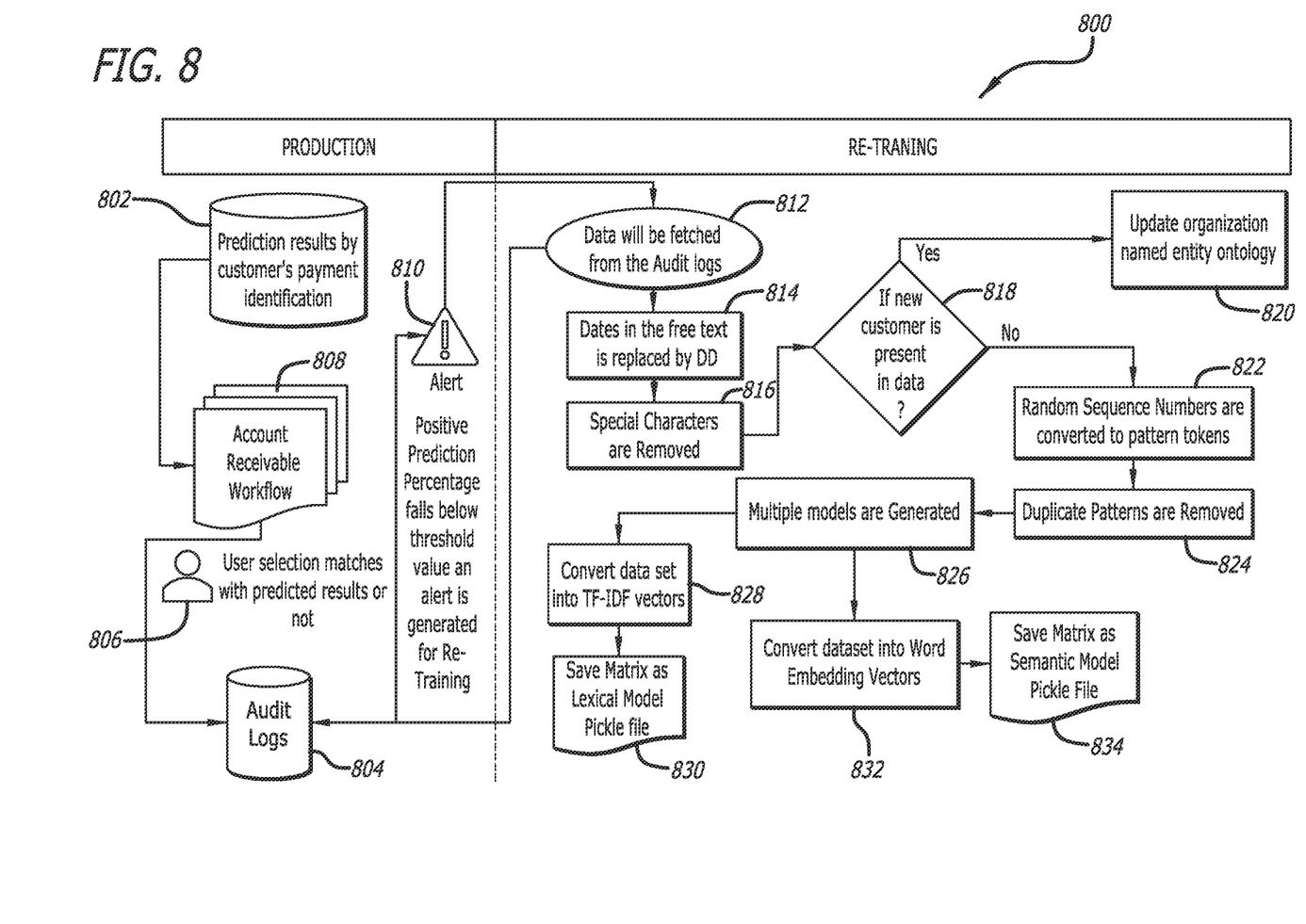
FIG. 8 is a flowchart of a re-training process used to re-train an AI/ML system, according to one embodiment.

If the positive (correct) prediction percentage falls below a specified, reconfigurable minimum threshold, an alert may be generated at step 810. Additionally or in the alternative, if the negative (incorrect) prediction percentage exceeds a specified, reconfigurable maximum threshold, an alert may be generated at step 810. Upon the triggering of an alert, the AIS/MLS embodiment enters the re-training mode and re-trains the ML model(s) using a new set of training data that may include the bank statements (database records, in general) that were incorrectly processed. The new set of training data may augment the previously used training data set, where the previously used training data set may be used in its entirety or only a portion thereof may be used.

Specifically, in step 812 data is extracted from the audit log(s), where the extracted data may include some or all database records (e.g., bank-statement records) that were not analyzed correctly. These records may be combined with the records that were used in earlier training of the embodiment of the AIS/MLS, to obtain an updated training set of database records. Dates in the description text of these records may be converted into a standardized form or into the string "DD," in the optional step 814. Special characters from the description text of the records may be removed in the optional step 816. Thus, the new training data set, that may be pre-processed, is available for re-training.

Thereafter, it is determined in step 818 that the new training data set includes a new customer that has not yet been identified by the embodiment of the AI/ML system. If so, the named entity ontology is updated in step 820, and a revised name recognition model is generated. Otherwise, in steps 822-832, the embodiment of the AI/ML system is re-trained. Specifically, in step 822, pattern tokens are generated from character sequences in database records (e.g., description fields in bank-statement records). Duplicate patterns may be removed in step 824.

Thereafter, one or more ML models is regenerated in step 826. To this end, in the optional step 828, the pattern tokens may be converted into TF-IDF vectors, and the vectors may be included in an updated ML model, which may be saved as a pickle file 830. Additionally or in the alternative, in the optional step 832, the pattern tokens may be converted into word embedding vectors, and these vectors may be included in an updated model, saved as a pickle file 834. The updated ML model(s) may then be used for subsequent predictions.

In the example of processing bank statements, the prediction and post-prediction operations typically include: (1) Extraction of customer name from a bank statement using an embodiment of AIS/MLS, and checking for open invoices in an invoice database that match with the extracted name; (2) Identifying other keys (e.g., invoice number, customer number, etc.) from the bank statement using the same or a different embodiment of AIS/MLS, where a customer can be identified using the other keys; and (3) Tagging of remittances received from bank/collector/customer in the invoice database so that the invoice may be closed. The tagging operation may include extraction of the payment amount from the matching bank records.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept.

What is claimed is:

1. A method for matching database records, the method comprising:
    receiving a record from a first database;
    selecting a sequence of characters within the record;
    identifying and extracting, from the sequence of characters, information that is predicted to be an identifier of the record of the first database, the identifier created by and specific to a second, dissimilar database, using one or more analytical processes, wherein the one or more analytical processes are performed by training multiple machine learning (ML) models based on a plurality of historical records and feeding the sequence of characters to the multiple trained ML models to generate the identified information, wherein the multiple ML models include an identity model using regular expression matching, a named entity recognition model using a conditional random field algorithm, and one or more pattern similarity models trained based on term frequency inverse document frequency (TF-IDF) vectors and word embedding vectors;
    applying a set of priority rules to prioritize and aggregate the identified information from the multiple ML models of the one or more analytical processes in an order of the identity model, the named entity recognition model, and the one or more pattern similarity models;
    determining whether a confidence score associated with the aggregated information exceeds a threshold;
    in response to determining that the confidence score associated with the extracted information exceeds the threshold, using the information extracted from the first database as a digital key associated with a user to retrieve a second, dissimilar record from the second, dissimilar database associated with the user;
    in response to an alert associated with the extracted information, retraining the one or more analytical processes including regenerating at least one ML model to update subsequent identifier prediction; and
    performing post-prediction operations including identifying open records associated with the user based on the digital key and processing and closing the identified records.

2. The method of claim 1, wherein:
    the first database is a bank database;
    the record from the first database is included in a bank statement;
    the second database is a customer invoice database; and
    the digital key is a customer account number.

3. The method of claim 1, wherein:
    the digital key is defined by a regular expression; and
    one of the one or more analytical processes is a regular expression based extraction process.

4. The method of claim 3, wherein the digital key is an invoice number.

5. The method of claim 1, wherein:
    the digital key is a customer name; and
    one of the one or more analytical processes is an entity name recognition process.

6. The method of claim 5, wherein the entity name recognition process uses a conditional random field ML model.

7. The method of claim 1, wherein one of the one or more analytical processes is performed by:
    converting the sequence into a TF-IDF vector; and
    comparing the TF-IDF vector with a plurality of TF-IDF model vectors based on historical data, using a cosine similarity score or a root mean square error (RMSE) similarity score.

8. The method of claim 1, wherein one of the one or more analytical processes comprises:
    converting the sequence into a word embedding vector; and
    comparing the word embedding vector with a plurality of word embedding model vectors based on historical data, using a root mean square error (RMSE) similarity score.

9. The method of claim 1, wherein:
    identifying and extracting, from the sequence of characters, the information comprises aggregating results of the one or more analytical processes, aggregating the results further comprising:
        obtaining a respective candidate key via each of the one or more analytical processes, each analytical process providing the respective confidence score; and
        extracting a particular candidate key based on a maximum of confidence scores.

10. The method of claim 9, wherein the one or more analytical processes include at least two analytical processes, and respective candidate keys provided by the at least two analytical processes are the same.

11. The method of claim 1, further comprising:
    pre-processing and tokenizing the sequence of characters prior to identifying and extracting, from the sequence of characters, the information.

12. A system for matching database records, the system comprising:
    a processor; and
    a memory in communication with the processor and comprising instructions which, when executed by the processor, program the processor to:
        receive a record from a first database;
        select a sequence of characters within the record;
        identify and extract, from the sequence of characters, information that is predicted to be an identifier of the record of the first database, the identifier created by and specific to a second, dissimilar database, using one or more analytical processes, wherein the one or more analytical processes are performed by training multiple machine learning (ML) models based on a plurality of historical records and feeding the sequence of characters to the multiple trained ML models to generate the identified information, wherein the multiple ML models include an identity model using regular expression matching, a named entity recognition model using a conditional random field algorithm, and one or more pattern similarity models trained based on term frequency inverse document frequency (TF-IDF) vectors and word embedding vectors;

apply a set of priority rules to prioritize and aggregate the identified information from the multiple ML models of the one or more analytical processes in an order of the identity model, the named entity recognition model, and the one or more pattern similarity models;

determine whether a confidence score associated with the aggregated information exceeds a threshold;

in response to determining that the confidence score associated with the extracted information exceeds the threshold, use the information extracted from the first database as a digital key associated with a user to retrieve a second, dissimilar record from the second, dissimilar database associated with the user;

in response to an alert associated with the extracted information, retrain the one or more analytical processes including regenerating at least one ML model to update subsequent identifier prediction; and perform post-prediction operations including identifying open records associated with the user based on the digital key and processing and closing the identified records.

13. The system of claim 12, wherein:
the first database is a bank database;
the record from the first database is included in a bank statement;
the second database is a customer invoice database; and
the digital key is a customer account number.

14. The system of claim 12, wherein:
the digital key is defined by a regular expression; and
one of the one or more analytical processes is a regular expression based extraction process.

15. The system of claim 13, wherein the digital key is an invoice number.

16. The system of claim 12, wherein:
the digital key is a customer name; and
one of the one or more analytical processes is an entity name recognition process.

17. The system of claim 16, wherein the entity name recognition process uses a conditional random field ML model.

18. The system of claim 12, wherein to perform one of the one or more analytical processes, the instructions program the processor to:
convert the sequence into a TF-IDF vector; and
compare the TF-IDF vector with a plurality of TF-IDF model vectors based on historical data, using a cosine similarity score or a root mean square error (RMSE) similarity score.

19. The system of claim 12, wherein to perform one of the one or more analytical processes the instructions program the processor to:
convert the sequence into a word embedding vector; and
compare the word embedding vector with a plurality of word embedding model vectors based on historical data, using a root mean square error (RMSE) similarity score.

20. The system of claim 12, wherein:
to identify and extract, from the sequence of characters, the information, the instructions program the processor to aggregate results of the one or more analytical processes; and
to aggregate the results, the instructions further program the processor to:
obtain a respective candidate key via each of the one or more analytical processes, each analytical process providing the respective confidence score; and
extract a particular candidate key based on a maximum of confidence scores.

21. The system of claim 20, wherein the one or more analytical processes include at least two analytical processes, and respective candidate keys provided by the at least two analytical processes are the same.

22. The system of claim 12, wherein the instructions further program the processor to:
pre-process and tokenize the sequence of characters prior to identifying and extracting, from the sequence of characters, the information.

* * * * *